(12) United States Patent
Fukuo et al.

(10) Patent No.: US 7,485,406 B2
(45) Date of Patent: Feb. 3, 2009

(54) PHOTOSTORAGE SOLID DRAWING MEDIUM

(75) Inventors: Hidetoshi Fukuo, Osaka (JP);
Masamitsu Takahashi, Osaka (JP);
Kotaro Sumitomo, Osaka (JP)

(73) Assignee: Sakura Color Products Corporation, Osaka (JP)

( * ) Notice: Subject to any disclaimer, the term of this patent is extended or adjusted under 35 U.S.C. 154(b) by 377 days.

(21) Appl. No.: 11/399,543

(22) Filed: Apr. 7, 2006

(65) Prior Publication Data

US 2006/0210924 A1 Sep. 21, 2006

Related U.S. Application Data

(63) Continuation-in-part of application No. 10/980,336, filed on Nov. 4, 2004, now abandoned.

(30) Foreign Application Priority Data

| Nov. 7, 2003 | (JP) | ............................. 2003-378466 |
| Nov. 7, 2003 | (JP) | ............................. 2003-378485 |
| Nov. 20, 2003 | (JP) | ............................. 2003-390820 |
| Nov. 20, 2003 | (JP) | ............................. 2003-390952 |

(51) Int. Cl.
*G03F 7/00* (2006.01)

(52) U.S. Cl. .................... 430/270.1; 430/139; 430/494; 430/905

(58) Field of Classification Search .............. 430/270.1, 430/139, 494, 905
See application file for complete search history.

(56) References Cited

U.S. PATENT DOCUMENTS

| 5,064,806 | A | * | 11/1991 | Torii et al. | ................... 503/200 |
| 6,921,747 | B2 | * | 7/2005 | Hanabusa et al. | ............... 514/2 |
| 2005/0035331 | A1 | * | 2/2005 | Sun | .......................... 252/301.5 |

FOREIGN PATENT DOCUMENTS

WO 02/083814 A1 10/2002

* cited by examiner

*Primary Examiner*—Amanda C. Walke
(74) *Attorney, Agent, or Firm*—Wenderoth, Lind & Ponack, L.L.P.

(57) ABSTRACT

The invention provides a photostorage solid drawing medium comprising a solvent, a resin soluble in the solvent, a photostorage pigment and a gelling agent, wherein the photostorage pigment comprises a long afterglow fluorescent substance comprising an alkaline earth aluminosilicate as a matrix activated with a rare earth element wherein the alkaline earth element is at least one selected from the group consisting of strontium, calcium, magnesium and barium. The solvent used is a polar solvent, particularly a mixture of water and a water-soluble organic solvent, or at least one alcoholic solvent selected from the group consisting of glycols, glycol ethers, glycol ether esters and monovalent alcohols.

10 Claims, 1 Drawing Sheet

PHOTOSTORAGE SOLID DRAWING MEDIUM

This is a Continuation-in-Part of U.S. Ser. No. 10/980,336, filed Nov. 4, 2004, now abandoned.

TECHNICAL FIELD

The present invention relates to a photostorage solid drawing medium which is suitably used in drawing utensils, writing instruments, printing ink, coatings and cosmetics and in fields related thereto, as well as a photostorage solid drawing utensil containing the same in a container.

BACKGROUND ART

Emission occurring only during irradiation of a substance with light, that is, only under stimulation with light, is generally called fluorescence and a substance with this property is called a fluorescent substance. Emission lasting even after termination of stimulation of the substance with light is called phosphorescence or afterglow, and a substance with this property is called a phosphorescent substance. There is a phosphorescent substance observed to exhibit afterglow for dozens of minutes to several hours after termination of light stimulation, and a substance with this property is called a photostorage or long afterglow florescent substance. Accordingly, a pigment containing the fluorescent substance emits light only during irradiation with light, while a pigment containing the photostorage fluorescent substance, unlike the fluorescent pigment, emits light over a long time even after termination of irradiation with light. Such a pigment is called a photostorage pigment.

Conventionally, an ink composition using such photostorage pigment is known. For example, JP-A-9-53034 (1997) and JP-A-9-59555 (1997) describe respectively a photostorage ink composition using a long afterglow florescent substance ($Sr.Al_2O_4$: Eu) comprised of a compound represented by the formula $Sr.Al_2O_4$ as a mother crystal and europium (Eu) as an activator. JP-A-2000-104001 and JP-A-2000-109740 describe respectively a photostorage ink composition using a long afterglow fluorescent substance ($Sr.Al_{2-x}B_xO_4$: Eu) comprised of a compound represented by the general formula $Sr.Al_{2-x}B_xO_4$ wherein x is a numeral in the range $0.1 \leq x \leq 1$ and europium (Eu) as an activator.

However, such conventionally known photostorage pigment is chemically unstable and is particularly lacking water resistance so that when it is used as a coloring agent in an ink composition, a nonpolar hydrocarbon solvent such as xylene should be inevitably used, and there is a problem that upon subjection to writing on usual paper, such ink composition causes bleeding. Because the nonpolar hydrocarbon solvent is used as a dispersing medium of the photostorage pigment as described above, there is another problem that a container or a holder for encapsulating such ink composition is limited to the one consisting of a solvent-resistant material. Further, the conventional photostorage pigment has practically various problems; for example, there is a problem that after termination of irradiation with light, the duration of afterglow is so short that the photostorage pigment cannot be used in applications requiring long-lasting emission in the nighttime.

Conventionally, a writing instrument with the above-described photostorage ink composition charged into a container is also known. This writing instrument contains the above-described ink composition charged and sealed in an opaque container made of resin, so that while the writing instrument is not used, the ink composition in the container is not irradiated with light, and when the writing instrument is used in writing, the resulting handwriting is irradiated for the first time, and therefore there is a problem that the handwriting does not emit light not only during writing but also just after writing.

SUMMARY OF THE INVENTION

Accordingly, an object of the invention is to provide a photostorage solid drawing medium, for example a photostorage solid marker or a crayon-like photostorage solid drawing medium, which can use a mixture of water and a water-soluble organic solvent, or an alcoholic polar solvent, as a main dispersing medium for a photostorage pigment, unlike the conventional photostorage pigment, to give drawn lines or handwriting (referred to hereinafter as drawn lines) with less bleeding, can be encapsulated into a container formed of inexpensive general-purpose resin represented by polypropylene, and can form drawn lines with longer duration of afterglow on a drawing surface or a writing surface (referred to hereinafter as drawing surface) than that of a drawing medium using the conventional photostorage pigment.

Further, another object of the invention is to provide a photostorage solid drawing utensil in which the photostorage solid drawing medium in the container is irradiated with light when not used and drawn lines emitting light can be thus given immediately upon drawing.

The invention provides a photostorage solid drawing medium comprising a solvent, a resin soluble in the solvent, a photostorage pigment and a gelling agent, wherein the photostorage pigment comprises a long afterglow fluorescent substance comprising an alkaline earth aluminosilicate as a matrix activated with a rare earth element wherein the alkaline earth element is at least one selected from the group consisting of strontium, calcium, magnesium and barium.

According to the invention, a mixture of water and a water-soluble organic solvent, that is, an aqueous solution of a water-soluble organic solvent, or at least one alcoholic solvent selected from the group consisting of glycols, glycol ethers, glycol ether esters and monovalent alcohols, is preferably used as the solvent.

The aqueous photostorage solid drawing medium using the mixture of water and a water-soluble organic solvent, as a solvent serving as a dispersing medium for the photostorage pigment, particularly preferably employs as the gelling agent at least one member selected from the group consisting of an aliphatic carboxylic acid, its salt, N-fatty acid acylamino acid and its salt, while the oil-based photostorage solid medium using the alcoholic solvent, as a solvent serving as a dispersing medium for the photostorage pigment, particularly preferably employs as the gelling agent dibenzylidene sorbitols, tribenzylidene sorbitols, amino acid-based gelling agents, fatty acids etc.

Thus, the photostorage solid drawing medium of the invention comprises a solvent, a resin soluble in the solvent, a photostorage pigment and a gelling agent, wherein the photostorage pigment comprises a long afterglow fluorescent substance comprising an alkaline earth aluminosilicate as a matrix activated with a rare earth element, so that unlike the conventional photostorage solid drawing medium, the photostorage solid drawing medium of the invention even using a mixture of water or a water-soluble organic solvent, or an alcoholic polar solvent, as a main dispersing medium for the photostorage pigment, can give drawn lines with less bleeding to common paper upon drawing, can use as a container a molded product formed of inexpensive general-purpose resin represented by polypropylene, and can form drawn lines with longer duration of afterglow than that of a solid drawing medium using the conventional photostorage pigment.

BEST MODE FOR CARRYING OUT THE INVENTION

The photostorage solid drawing medium according to the invention is a solid composition having photostorability for use in drawing, comprising a solvent, a resin soluble in the solvent, a photostorage pigment and a gelling agent, wherein the photostorage pigment comprises a long afterglow fluorescent substance comprising an alkaline earth aluminosilicate as a matrix activated with a rare earth element wherein the alkaline earth element is at least one selected from the group consisting of strontium, calcium, magnesium and barium.

The above-mentioned photostorage pigment is already known, as described in WO 02/083814. In more detail, the photostorage pigment used in the invention is such a pigment that comprises a long afterglow fluorescent substance comprising an alkaline earth aluminosilicate as a matrix activated with a rare earth element, and is represented by the general formula MO·$aAl_2O_3$·$bSiO_2$·$cX$;$fX$ wherein M is an alkaline earth element selected from the group consisting of strontium, calcium, magnesium and barium; L is a mineralizer; X is a rare earth element activator; and a, b, c and f are numerals expressed in terms of parts by mol per part by mole of MO, i.e., molar ratios to 1 mol of MO and satisfying the conditions: $0.3 \leq (a+b) \leq 3$, b is in the range of 0.01a to 200a, c is in the range of 0.02 to 0.5, and f is in the range of 0.001 to 0.05.

Examples of the mineralizer used include, for example, an ammonium halide such as ammonium chloride, ammonium bromide or ammonium iodide, an alkali metal halide such as sodium chloride, sodium fluoride or lithium fluoride, boron oxide, and ammonium secondary phosphate. The rare earth element activator used is europium and it is preferably used in conjunction with a rare earth element co-activator which is at least one selected from the group consisting of dysprosium, cerium, neodymium, praseodymium, samarium, terbium, holmium, erbium, thulium and ytterbium. The rare earth element co-activator is used usually in an amount of 0.1-5 parts by mol in relation to 1 part by mol of europium. Among the above-mentioned rare earth element co-activators, dysprosium or neodymium is particularly preferred.

The alkaline earth aluminosilicates activated with a rare earth element used in the invention are neutral in water and have main peaks in a range of 440-510 nm in the emission spectra, depending on the components used.

The alkaline earth aluminosilicate activated with a rare mentioned as above is produced by a method as follows, for example. A carbonate or an oxide of the alkaline earth element, aluminum oxide, silicon dioxide, a mineralizer and one or more of oxides of rare earth elements are mixed in such a molar ratio as mentioned above and the resulting mixture is calcined at a temperature in a range of 1200° C. to 1450° C. over a period of two to four hours in a reductive atmosphere. After the resulting product is pulverized and sieved, the product is washed with diluted hydrochloric acid or an alcohol, and dried, followed by pulverizing, if necessary, thereby providing the desired alkaline earth aluminosilicate activated with a rare earth element. The reductive atmosphere is, for example, an atmosphere composed of mixture of hydrogen and nitrogen.

The photostorage pigment as mentioned above is available from TDO Graphics Co., Ltd. There may be mentioned as examples of such photostorage pigments, "TDG Series" emitting light having a yellowish green color, "TDB Series" emitting light having a bluish green color and "TDS Series" emitting light having a blue color.

The photostorage solid drawing medium of the invention contains the photostorage pigment in the range of 1.0 to 60.0 wt %, preferably 5.0 to 50.0 wt %, based on the solid drawing medium. When the amount of the photostorage pigment in the photostorage solid drawing medium is lower than 1.0 wt %, its emission is insufficient, while when the amount of the photostorage pigment is higher than 60.0 wt %, the solid drawing medium containing such a large amount of the photostorage pigment is hardly molded, and the resulting solid drawing medium is inferior in drawing properties.

According to the invention, a mixture of water and a water-soluble organic solvent, or at least one alcoholic solvent selected from the group consisting of glycols, glycol ethers, glycol ether esters and monovalent alcohols, is used preferably as a solvent serving as the dispersing medium for the photostorage pigment.

First, the aqueous photostorage solid drawing medium using, as the solvent, a mixture of water and a water-soluble organic solvent is described.

The water-soluble organic solvent includes, for example, monovalent alcohols having one to four carbon atoms such as methyl alcohol, ethyl alcohol, isopropyl alcohol and n-butyl alcohol, aliphatic polyvalent alcohols having three to five carbon atoms such as glycerin and trimethylol propane, mono- or polyalkylene glycols having two to ten carbon atoms such as ethylene glycol, propylene glycol, diethylene glycol, dipropylene glycol, triethylene glycol and tripropylene glycol, monoalkyl ethers of the above-described mono- or polyalkylene glycols wherein the alkyl has one to four carbon atoms such as monomethyl ether, monoethyl ether, monopropyl ether and monobutyl ether, monoaryl ethers such as monophenyl ether, esterified products thereof such as acetates, and alkanol amines such as monoethanol amine, diethanol amine, triethanol amine, monoisopanol amine, diisopropanol amine and triisopropanol amine. These water-soluble organic solvents may be used alone or as a mixture of two or more thereof. Among the above-described organic solvents, aliphatic polyvalent alcohols such as glycerin and mono- or dialkylene glycols such as ethylene glycol, propylene glycol and diethylene glycol are preferably used.

In the aqueous photostorage solid drawing medium of the present invention, the solvent that is a mixture of water and a water-soluble organic solvent is used in an amount suitable in the relationship with other components such as a coloring agent etc., and is used usually in the range of 20 to 80 wt %, preferably 35 to 65 wt %. When the solvent is used in excess, gelation may be difficult in production of the solid drawing medium, while when the amount of the solvent is too small, other components may be hardly dissolved in the solvent, thus failing to form uniform gel. The content of the water-soluble organic solvent in the solvent used is not particularly limited, but is preferably in the range of 15 to 50 wt %.

The aqueous photostorage solid drawing medium of the invention contains at least one member selected from the group consisting of an aliphatic carboxylic acid, its salt, N-fatty acid acylamino acid and its salt as the gelling agent.

The aliphatic carboxylic acid is preferably such that it has carbon atoms in the range of 8 to 36, preferably 10 to 20, and it may be linear or branched. As the aliphatic carboxylic acid salt, an alkali metal salt or an ammonium salt is preferably used.

Accordingly, specific examples of the aliphatic carboxylic acids include, for example, caprylic acid, capric acid, undecanoic acid, lauric acid, myristic acid, palmitic acid, stearic acid, arachic acid, behenic acid, lignoceric acid, cerotic acid, montanic acid and melissic acid. Preferable examples of the alkali metal salts include, for example, lithium salts, potassium salts and sodium salts. The aliphatic carboxylic acid alkali metal salts include, for example, sodium laurate, sodium myristate, sodium palmitate, sodium stearate, sodium oleate, sodium behenate and mixtures thereof.

As preferred aliphatic carboxylic acid components of the N-fatty acid acylamino acid or its salt, there are mentioned the aliphatic carboxylic acids described above. On the other hand, as preferred amino acid components of the N-fatty acylamino acid or its salt, there are mentioned such aliphatic amino acids as glutamic acid, aspartic acid, glycine and alanine. Between the N-fatty acid acylamino acid or its salt, the salt of N-fatty acid acylamino acid is preferred, and more specifically, a sodium salt, disodium salt or monotriethanol amine salt of N-fatty acid acylamino acid is preferred. Accordingly, preferable examples of such salts of N-fatty acid acylamino acid include, for example, monosodium N-stearoyl-L-glutamate and monosodium N-mixed fatty acid acyl-L-glutamate.

The aqueous photostorage solid drawing medium of the invention contains the gelling agent in the range of 2 to 40 wt %, preferably 3 to 35 wt %, most preferably 5 to 30 wt %, based on the solid drawing medium. When the amount of the gelling agent in the photostorage solid drawing medium is lower than 2 wt %, the starting components may be hardly solidified in production of the solid drawing medium, thus making the resulting drawing medium poor in hardness, while when the amount of the gelling agent in the photostorage solid drawing medium is higher than 40 wt %, the resulting drawing medium is inferior in drawing properties.

The photostorage solid drawing medium of the invention further contains a resin soluble in the solvent used, preferably a water-soluble resin, as a binder gathering together the respective components forming the drawing medium, in order to improve the adhesion of drawn lines to a drawing surface.

The water-soluble resin includes, for example, vinyl resins such as polyvinyl alcohol, polyvinyl pyrrolidone and poly-N-vinylacetamide, cellulose resins such as carboxymethyl cellulose, carboxyethyl cellulose and hydroxypropyl cellulose, starch and starch derivatives such as solubilized starch, etherified starch, esterified starch, α-starch, oxidized starch, enzyme-modified dextrin, acid-decomposed starch and baked dextrin, styrene/maleic acid copolymer, methyl vinyl ether/maleic anhydride copolymer, ethylene/maleic anhydride copolymer, styrene/maleic anhydride copolymer, acrylate/styrene copolymer etc. These water-soluble resins are used singly or as a combination of two or more thereof. Such water-soluble resins are used usually in the range of 1 to 40 wt %, preferably 1.5 to 20 wt %, based on the solid drawing medium.

The aqueous photostorage solid drawing medium may optionally contain antiseptic preservatives such as benzoisothiazolines, pentachlorophenols and cresol, gelling regulators, thixotropic agents, solubilizers, surfactants etc., in addition to the components described above.

Now, the oil-based photostorage solid drawing medium using the alcoholic solvents as the solvent is described.

The alcohol solvent includes, for example, monovalent alcohols, glycols, glycol ethers, and esters thereof, and specific examples include, for example, more monovalent alcohols having one or more carbon atoms such as methanol, ethanol, isopropyl alcohol, n-butyl alcohol, 3-methyl-3-methoxybutanol and 3-methoxy-1-butanol, mono- or poly-alkylene glycols having two to ten carbon atoms such as ethylene glycol, propylene glycol, diethylene glycol and dipropylene glycol, monoalkyl ethers of the mono- or poly-alkylene glycols wherein the alkyl has one to four carbon atoms such as monomethyl ether, monoethyl ether, monopropyl ether and monobutyl ether, monoaryl ethers such as monophenyl ether, and esterified products of these such as acetates.

According to the invention, at least one member selected from the group consisting of ethylene glycol monobutyl ether, propylene glycol monomethyl ether, propylene glycol monopropyl ether, propylene glycol monobutyl ether, dipropylene glycol monomethyl ether and 3-methyl-3-methoxybutanol is preferably used.

However, aromatic hydrocarbons such as xylene and tetralin, cyclohexanes which may have alkyl substituents thereon, such as cyclohexane, n-propyl cyclohexane and n-butyl cyclohexane, ketones such as methyl isobutyl ketone, and aliphatic carboxylates such as butyl acetate and butyl propionate, in addition to the solvents described above, can also be used in the oil-based photostorage solid drawing medium.

In the oil-based photostorage solid drawing medium, the solvent is used in an amount suitable in the relationship with other components such as a coloring agent etc., and is used usually in the range of 20 to 80 wt %, preferably 35 to 65 wt %. When the solvent is used in excess, gelation of the starting components may be difficult in production of the photostorage solid drawing medium, while when the amount of the solvent is too small, other components may be hardly dissolved in the solvent, thus failing to form uniform gel.

In such an oil-based photostorage solid drawing medium, a gelling agent used in the conventional oil-based photostorage solid drawing medium can be suitably used. The gelling agent includes, for example, dibenzylidene sorbitols, tribenzylidene sorbitols, amino acid-based oil-based gelling agents, fatty acids etc.

The dibenzylidene sorbitols can be exemplified by dibenzylidene sorbitol and dibenzylidene sorbitol substituted with alkyl groups of one to three carbon atoms at arbitrary positions on a benzene nucleus in the benzylidene group thereof, and specific examples include [di-(p-methylbenzylidene)]sorbitol, [di-(m-ethylbenzylidene)]sorbitol, [di-(p-chlorobenzylidene)]sorbitol, etc.

The tribenzylidene sorbitols can be exemplified by tribenzylidene sorbitol and tribenzylidene sorbitol substituted with alkyl group of one to three carbon atoms at arbitrary positions on a benzene nucleus in the benzylidene group thereof, and specific examples include [tri-(p-methylbenzylidene)]sorbitol, [tri-(m-ethylbenzylidene)]sorbitol, [tri-(p-chlorobenzylidene)]sorbitol etc.

The amino acid-based oil-based gelling agents include, for example, N-acylglutamic acid diamide, N-lauroylglutamic acid di-n-butylamide etc. The fatty acids include, for example, stearic acid, myristic acid and 12-hydroxystearic acid, hydroxy fatty acids, and metal salts thereof such as alkali metal salts and ammonium salts.

The oil-based photostorage solid drawing medium of the invention contains the gelling agent in a suitable amount depending on the type of gelling agent used, and usually in the range of 2 to 40 wt %, preferably 3 to 35 wt %, most preferably 5 to 30 wt %, based on the photostorage solid drawing medium. When the amount of the gelling agent is too high in the solid drawing medium, the resulting gel has too high hardness and deteriorates coloring properties etc., while when the amount of the gelling agent is too low, the starting components are hardly gelled in production of the solid drawing medium.

The oil-based photostorage solid drawing medium of the invention contains an adhesive resin soluble in the alcoholic solvent so that upon drawing using the same, drawn lines have adhesiveness to a drawing surface. This adhesive resin is not particularly limited insofar as it is conventionally used for the above object in oil-based photostorage solid drawing mediums. According to a preferred embodiment, the oil-based photostorage solid drawing medium of the invention contains a film-forming resin soluble in the alcoholic solvent so that the resulting solid drawing medium has suitable hardness, and upon drawing, a strong film is formed on a drawing surface.

On one hand, the adhesive resin is not particularly limited insofar as it can increase the adhesion of drawn lines to a drawing surface, and for example, ketone resin, xylene resin, polyamide resin, acrylic resin etc. are preferably used. The ketone resin is exemplified by, for example, cyclohexanone/formaldehyde condensates. The xylene resin is exemplified by, for example, m-xylene/formaldehyde condensates. The polyamide resin is exemplified by, for example, thermoplastic resin having a molecular weight of about 4000 to 9000, obtained by polycondensation of dimer acid with di- or polyamine. These adhesive resins may be used alone or as a mixture of two or more thereof.

The film-forming resin is not particularly limited insofar as it can give sufficient hardness to the resulting solid drawing medium and simultaneously form a strong film on a drawing surface, and examples of such resin include cellulose resin such as cellulose acetate butyrate, ethyl cellulose and acetyl cellulose, and vinyl resin such as polyvinyl butyral, polyvinyl acetate, vinyl acetate/vinyl chloride copolymer resin, and vinyl acetate/ethylene copolymer resin. These film-forming resins may be used alone or as a mixture of two or more thereof. Among these, polyvinyl butyral resin having 5% or less acetyl group, 18 to 40% hydroxyl group, 60% or more butyral group, and a polymerization degree of 300 to 2000 is particularly preferably used.

In the oil-based photostorage solid drawing medium of the invention, the content of the resin is varied depending on the type of resin used among others, and it is usually in the range of 1 to 40 wt %, preferably 3 to 40 wt %, most preferably 6 to 35 wt %. When the content of the resin is too high in the solid drawing medium, the resulting gel has too high hardness, reduces color density and lowers photostorage coloration. On the other hand, when the content of the resin in the solid drawing medium is too low, the respective components are hardly gelled.

When the film-forming resin and the adhesive resin are used in combination, their proportions can be determined suitably in the relationship with other components. Usually, the film-forming resin/adhesive resin ratio by weight is from about 1/0.1 to 1/15, preferably from about 1/0.2 to 1/13.

Particularly when acrylic resin is used as the adhesive resin and the amount of the acrylic resin in the total amount of the resins used is 50 wt % or more, a photostorage pigment usually having an average particle diameter of about 5 to 100 µm, which is larger than that of general pigment, can be efficiently carried on a smooth drawing surface, resulting in higher emission luminance. This is because when acrylic resin is used as the adhesive resin, the gel elasticity of the resulting solid drawing medium that is gel is kept low, and when the elasticity of the solid drawing medium is thus kept low, the solid drawing medium easily collapses to permit the photostorage pigment to be applied even on a smooth drawing surface. Accordingly, when the ratio of acrylic resin used as the adhesive resin is 50 wt % or more relative to the total amount of the resins used, the photostorage solid drawing medium excellent in drawing properties can be obtained even if the film-forming resin is not used.

The oil-based photostorage solid drawing medium of the invention may contain a wide variety of conventionally known additives such as a filler, a leveling agent, a viscosity regulator, a structural tackifier, a drying agent etc., if necessary, in addition to the components described above. If necessary, a plasticizer such as diethyl phthalate, dibutyl phthalate, dioctyl phthalate, butylbenzyl phthalate, 2-ethylhexyl epoxy hexahydrophthalate, 2-ethylhexyl sebacate or tricresyl phosphate may be suitably contained.

The photostorage solid drawing medium of the invention, whether aqueous or oil-based, comprises a solvent, a resin, a photostorage pigment and a gelling agent as described above, but may if necessary contain coloring agents other than the photostorage pigment, and by using such coloring agents, a desired color can be given to lines drawn by the solid drawing medium. The coloring agent is not particularly limited insofar as it does not react with the photostorage pigment or does not influence the coloration of the photostorage pigment. When the photostorage solid drawing medium of the invention does not contain the coloring agent, drawn lines having a pale hue not remarkable in a bright place while having an emission color inherent in the photostorage pigment in the dark are formed.

As the coloring agent, dyes soluble used in the solvent used, for example, acidic dyes and basic dyes, organic pigments and inorganic pigments such as phthalocyanine, quinacridone, carbon black and titanium oxide, and fluorescent pigments can be used. The dyes can be exemplified by, for example, dyes based on triphenyl methane, xanthene, anthraquinone, metal complexes and copper phthalocyanine. The coloring agent can also be blended as a pigment dispersion into the solid drawing medium. The coloring agent can be used as a mixture with luster pigments such as a metal-coated glass flake pigment, a metal-coated inorganic pigment, an aluminum pigment and a pearl pigment.

When the coloring agent is used, its amount is usually in the range of 0.05 to 15.0 wt % based on the solid drawing medium. When the amount of the coloring agent is lower than 0.05 wt % based on the solid drawing medium, the effect of the coloring agent is not exhibited. On the other hand, when the amount of the coloring agent is higher than 15.0 wt % based on the solid drawing medium, the solid drawing medium is inferior in emission by the photostorage pigment. The most preferable amount of the coloring agent, though varying in some degree depending on the type of the coloring agent used, is in the range of 0.1 to 10.0 wt %.

According to the invention, the gel hardness of the photostorage solid drawing medium, whether aqueous or oil-based, may be suitably established depending on its applications among others, but is usually about 2 to 50 kg/cm$^2$, preferably 4 to 40 kg/cm$^2$. The gel hardness can be regulated or controlled by the types and the amounts of the solvent, the gelling agent and the resin used.

The method of producing the photostorage solid drawing medium of the invention is not limited. For example, the starting materials other than the photostorage pigment and the gelling agent are mixed under heating, and then the photostorage pigment and the gelling agent are added to the resulting mixture and mixed under heating, and the thus obtained mixture in a solution form is solidified by cooling to give the photostorage solid drawing medium. Prior to the solidification of the mixture in a solution form by cooling, the mixture may be charged into a highly airtight container in order to give the solid drawing medium in a predetermined shape.

The photostorage solid drawing utensil according to the invention comprises a hollow holder, the above-described solid drawing medium accommodated in the holder, and a cap attached detachably to the tip of the holder, wherein the tip of the photostorage solid drawing medium is exposed from the tip of the holder to the inside of the cap, and at least a part of a container comprised of the holder and the cap is transparent so as to enable irradiation of the solid drawing medium with light from the outside.

Figure 1:
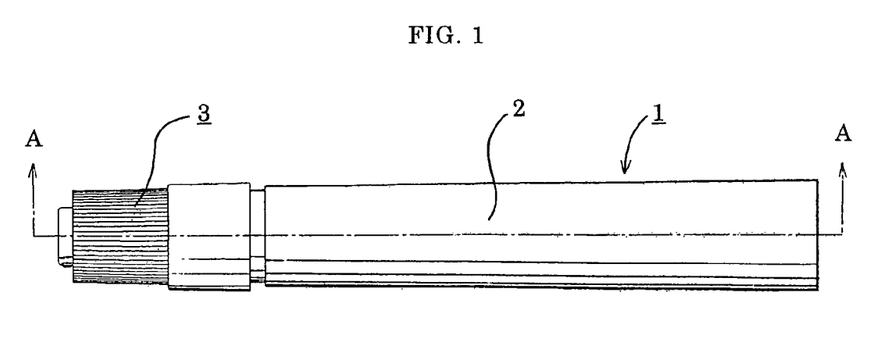
FIG. 1 is a front view showing an example of the photostorage solid drawing utensil according to the invention.
Figure 2:
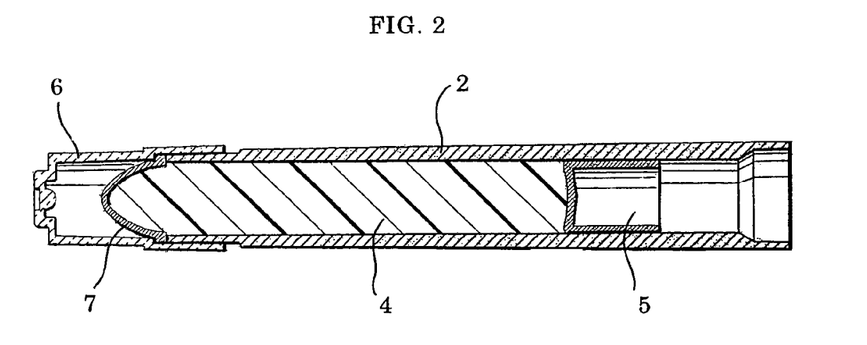
FIG. 2 is a longitudinal section of the photostorage solid drawing utensil along the line A-A in FIG. 1.

FIG. 1 shows an example of photostorage solid drawing utensil according to the invention, and FIG. 2 shows a longitudinal section thereof. As illustrated therein, the photostorage solid drawing utensil 1 includes a container comprising a holder 2 and a cap 3 attached detachably to the tip of the holder, a photostorage solid drawing medium 4 accommodated in the holder, and an end cap 5 inserted to abut the rear end of the photostorage solid drawing medium in the rear of the holder, and the tip of the storage solid drawing medium is exposed to protrude from the holder to the inside of the cap.

This example of the utensil has the cap comprised of an outer cap 6 and an inner cap 7, and the inner cap is fit coaxially to the tip of the holder in the outer cap, in order to advantageously produce the photostorage solid drawing utensil described later in a preferable embodiment of the invention. The outer cap and the inner cap may be integrally formed or may be formed separately from one another. The cap herein refers to a combination of the outer and the inner caps.

The photostorage solid drawing utensil of the invention has the photostorage solid drawing medium accommodated and closed in a container comprised of the holder and the cap so that the tip of the photostorage solid drawing medium is exposed from the tip of the holder to the inside of the cap and the solvent contained in the photostorage solid drawing medium is thereby prevented from being evaporated when the photostorage solid drawing medium is not used.

Therefore, the materials of the holder and cap are not particularly limited insofar as the permeability into the materials of the solvent contained in the photostorage solid drawing medium is low, and the holder and cap can be produced from materials, for example resins such as polypropylene resin, polyethylene resin, polystyrene resin, polyamide resin, polyacetal resin, acrylic resin, polyester resin and polyethylene terephthalate resin, metal, glass and ceramics. For excellent moldability, the holder and cap are particularly preferably formed from the above-mentioned resins.

According to the invention, at least a part of the container comprised of the holder and the cap is transparent such that even when the photostorage solid drawing utensil is not used, the solid drawing medium accommodated in the holder can be irradiated with light from the outside. Therefore, the whole of the holder and the cap may be transparent, and particularly the cap is preferably transparent. When the cap is transparent and the photostorage solid drawing medium is accommodated in the holder such that the tip of the photostorage solid drawing medium is exposed from the tip of the holder to the inner cap as illustrated in the figures, the exposed tip of the photostorage solid drawing medium is irradiated with light from the outside even when the photosensitive solid drawing utensil is not used, and thus when the photostorage solid drawing utensil is used in drawing, the resulting drawn lines immediately emit light in the dark. Further, the exposed tip of the photostorage solid drawing medium also emits light, thus making drawing easy in the dark.

The material for forming the transparent part of the container is preferably the one excellent in transparency, and for example polypropylene resin, polyethylene resin, polystyrene resin, polyethylene terephthalate resin, glass etc. are preferably used.

As described above, the inner cap is useful in production of the photostorage solid drawing utensil wherein the tip of the photostorage solid drawing medium is exposed so as to protrude from the holder to the inner cap. The photostorage solid drawing utensil of the invention is produced for example in the following manner. That is, the inner cap and the outer cap are fit to the tip of the holder thus closing the tip of the hollow holder, and then the above-described mixture in a solution form for the photostorage solid drawing medium is injected through the rear of the holder and solidified by cooling, and an end cap is then inserted through the rear end of the holder until the end cap buts the rear end of the photostorage solid drawing medium, to give a photostorage solid drawing utensil having the photostorage solid drawing medium accommodated and closed in the container such that the tip of the photostorage solid drawing medium is exposed so as to protrude from the holder to the inner cap. When the outer cap and the inner cap are separately formed, the role of the inner cap has already been finished after the photostorage solid drawing medium is charged into the holder, and thus the inner cap may be disposed of. In such case, therefore, the inner cap may be opaque if the outer cap is transparent. This is because the photostorage solid drawing medium exposed from the holder can, even when it is not used, receive light irradiation through the outer cap.

When such photostorage solid drawing utensil is used, the outer cap and the inner cap are detached from the holder, and the photostorage solid drawing medium exposed from the tip of the holder is used in drawing. When the photostorage solid drawing medium in the holder is reduced by using the same, the end cap is pushed into the holder to allow the tip of the photostorage solid drawing medium to be pushed and exposed out of the holder, thus making the drawing utensil usable in further drawing. When the photostorage solid drawing utensil is used initially by detaching the outer cap and the inner cap from the holder, the inner cap may be disposed of if the outer cap and the inner cap are separately formed, because the role of the inner cap has already been finished. In such a case too, the inner cap may be opaque if the outer cap is transparent. This is because after used initially in drawing, the photostorage solid drawing medium exposed from the holder can, even when it is not used, receive light irradiation through the outer cap.

According to the example of the photostorage solid drawing utensil described above, as the rear end of the photostorage solid drawing medium is reduced during drawing, the photostorage solid drawing medium in the holder is pushed by the end cap in the rear end thereby exposing the drawing medium from the tip of the holder. However, the form and structure of the holder and the mechanism of pushing the photostorage solid drawing medium in the holder to expose it from the tip are not limited.

It follows that for example, a plurality of rings are connected detachably and coaxially to a holder, and the photostorage solid drawing medium is accommodated in the holder, and as the photostorage solid drawing medium is reduced during use, the rings can be removed one after another from the tip of the holder to permit the photostorage solid drawing medium to be newly exposed from the tip of the holder.

Alternatively, a screwed bar extending in the axial direction is attached to the rear end of the photostorage solid drawing utensil, and a cylinder screwed therein so as to engage the screwed bar accommodates the screwed bar by engaging each other via the screw, and if necessary a guide for the photostorage solid drawing medium is accommodated in the holder so that the photostorage solid drawing medium can move in the holder, to give a lipstick-like structure wherein the photostorage solid drawing medium in the holder can arbitrary be pushed out from, or drawn into, the tip of the holder by rotating the end cap.

However, the photostorage solid drawing utensil of the invention may have any structures insofar as at least a part of a container comprised of the holder and the cap is transparent such that even when not used, the photostorage solid drawing medium can receive light irradiation.

The photostorage solid drawing medium of the invention contains the photostorage pigment described above, and has not only high photostorage emission but also excellent drawing properties on a drawing surface made of any material such as paper, metal, ceramics, plastics and glass. Further, the photostorage solid drawing medium is excellent in adhesion of drawn lines to a drawing surface, and the adhering drawn lines are free of color migration or removal of the photostorage pigment. Thus, the photostorage solid drawing medium of the invention is useful not only in drawing utensils and writing instruments but also in printing ink, coatings and cosmetics and in a wide variety of fields related thereto.

EXAMPLES

Using a photostorage pigment and other starting components shown below, an aqueous photostorage solid drawing medium was produced. That is, the components other than the photostorage pigment and the gelling agent were introduced into a container, stirred, dissolved and dispersed at a temperature of 80 to 90° C., and then the photostorage pigment and the gelling agent were added to the mixture and kept at a temperature of 80 to 90° C. under stirring for about 1 hour. Thereafter, the resulting mixture was poured into a highly airtight container and solidified by cooling, and the resulting solid was removed from the container to give a stick-shaped aqueous solid drawing medium called a solid marker.

Example 1

| | |
|---|---|
| Photostorage pigment[1] | 30.0 parts by weight |
| Gelling agent (sodium stearate) | 20.0 parts by weight |
| Water-soluble resin (polyvinyl alcohol)[1] | 6.0 parts by weight |
| Coloring agent[1] | 6.0 parts by weight |
| Water-soluble organic solvent (glycerin) | 6.0 parts by weight |
| Water-soluble organic solvent (diethylene glycol) | 3.0 parts by weight |
| Water | 29.0 parts by weight |

Example 2

| | |
|---|---|
| Photostorage pigment[1] | 30.0 parts by weight |
| Gelling agent (sodium stearate) | 15.0 parts by weight |
| Gelling agent (sodium palmitate) | 3.0 parts by weight |
| Water-soluble resin (polyvinyl alcohol)[1] | 2.0 parts by weight |
| Water-soluble resin (gum arabic) | 2.0 parts by weight |
| Water-soluble organic solvent (glycerin) | 4.0 parts by weight |
| Water-soluble organic solvent (propylene glycol) | 8.0 parts by weight |
| Antiseptic preservative[1] | 0.2 part by weight |
| Antiseptic preservative[2] | 0.2 part by weight |
| Thixotropic agent | 6.0 parts by weight |
| Water | 29.6 parts by weight |

Example 3

| | |
|---|---|
| Photostorage pigment[1] | 30.0 parts by weight |
| Gelling agent (sodium palmitate) | 18.0 parts by weight |
| Water-soluble resin (polyvinyl alcohol)[1] | 3.0 parts by weight |
| Water-soluble resin (polyvinyl pyrrolidone)[2] | 2.0 parts by weight |
| Coloring agent[2] | 1.0 part by weight |
| Water-soluble organic solvent (glycerin) | 5.0 parts by weight |
| Water-soluble organic solvent (diethylene glycol) | 5.5 parts by weight |
| Antiseptic preservative[1] | 0.3 part by weight |
| Antiseptic preservative[2] | 0.2 part by weight |
| Gel regulator | 8.0 parts by weight |
| Solubilizer | 4.0 parts by weight |
| Water | 23.0 parts by weight |

Example 4

| | |
|---|---|
| Photostorage pigment[1] | 30.0 parts by weight |
| Gelling agent (N-fatty acid acylamino acid salt)[1] | 12.0 parts by weight |
| Water-soluble resin (carboxymethyl cellulose)[3] | 2.0 parts by weight |
| Coloring agent[3] | 10.0 parts by weight |
| Water-soluble organic solvent (propylene glycol) | 7.0 parts by weight |
| Antiseptic preservative[1] | 0.2 part by weight |
| Antiseptic preservative[2] | 0.1 part by weight |
| Gel regulator | 5.0 parts by weight |
| Thixotropic agent | 1.0 part by weight |
| Water | 32.7 parts by weight |

Comparative Example 1

| | |
|---|---|
| Photostorage pigment[2] | 30.0 parts by weight |
| Gelling agent (sodium stearate) | 20.0 parts by weight |
| Water-soluble resin (polyvinyl alcohol)[1] | 6.0 parts by weight |
| Coloring agent[1] | 6.0 parts by weight |
| Water-soluble organic solvent (glycerin) | 6.0 parts by weight |
| Water-soluble organic solvent (diethylene glycol) | 3.0 parts by weight |
| Water | 29.0 parts by weight |

Comparative Example 2

| | |
|---|---|
| Photostorage pigment[1] | 4.0 parts by weight |
| Gelling agent (sodium stearate) | 20.0 parts by weight |
| Water-soluble resin (polyvinyl alcohol)[1] | 6.0 parts by weight |
| Coloring agent[1] | 6.0 parts by weight |
| Water-soluble organic solvent (glycerin) | 6.0 parts by weight |
| Water-soluble organic solvent (diethylene glycol) | 3.0 parts by weight |
| Water | 55.0 parts by weight |

(Notes)

Photostorage Pigment:
1) "TDG-3030T" containing an alkaline earth aluminosilicate as a matrix activated with a rare earth element as a long afterglow fluorescent substance and emitting yellowish green fluorescence, available from TDO Graphics Co., Ltd.
2) "G-300M" containing a long afterglow fluorescent substance represented by the chemical formula $Sr.Al_{14}O_{25}$: Eu, Dy and emitting yellowish green color fluorescence, manufactured by Nemoto & Co., Ltd.

Gelling Agent:
1) N-acylamino acid alkali metal salt "Amisoft HS-11" manufactured by Ajinomoto Co., Ltd.

Water-Soluble Resin:
1) Polyvinyl alcohol "PVA-403" manufactured by Kuraray Co., Ltd.
2) Polyvinyl pyrrolidone "Luviscol K-30" manufactured by BASF.
3) Carboxymethyl cellulose "CMC-1105" manufactured by Daicel, Ltd.

Coloring Agent:
1) Green fluorescent pigment (resin emulsion) "LUMIKOL NKW-2102" manufactured by Nippon Keiko Kagaku Co., Ltd.
2) Yellow dye, Acid Yellow 73 (Yellow 202 (1)) manufactured by Aizen Hodogaya Co., Ltd.
3) 5 parts by weight of phthalocyanine blue ("Fastgen Blue-TGR" manufactured by Dainippon Ink and Chemicals, Incorporated) and 1 part by weight of pigment-dispersing resin (styrene/acrylic resin, "Joncryl J683", weight-average molecular weight 8000, manufactured by Johnson Polymer Corporation) were mixed, and triethylamine was added to the mixture which was then dispersed by a bead mill to give an aqueous pigment dispersion having an average particle diameter of 0.08 μm and a solids content of 10 wt %, and this product was used as blue pigment.

Antiseptic Preservative:
1) 1,2-Benzoisothiazolin-3-one ("Proquecell GXL" manufactured by Avecia K.K.)
2) "Dencil P" manufactured by Avecia K.K.

Gel Regulator:
Nonionic surfactant "EMULGEN 105" manufactured by Kao Corporation.

Thixotropic Agent:
Silica "Aerosil R202" manufactured by Nippon Aerosil Co., Ltd.

Solubilizer:
Citric acid

The respective solid markers produced in Examples 1 to 4 and Comparative Examples 1 and 2 were used in drawing on commercial drawing paper, and the emission intensity and afterglow intensity of the resulting drawn lines were examined. The emission intensity was examined by irradiating drawn lines with a 28-W fluorescent lamp for 10 minutes and then relatively comparing their emission intensity in the dark. The afterglow intensity was examined by irradiating the drawn lines with a 28-W fluorescent lamp for 10 minutes, and then leaving them for 10 minutes in the dark to compare their emission intensity. The emission intensity with time was examined by leaving the solid markers at a temperature of 50° C. for 14 days and then comparing the emission intensity in the same manner as for the emission intensity described above. In evaluation of the emission intensity, afterglow intensity and emission intensity with time, a specimen having strong emission of drawn lines in the dark was expressed as S, and a specimen having weak emission was expressed as W. The results are shown in Table 1.

TABLE 1

| | Examples | | | | Comparative | |
|---|---|---|---|---|---|---|
| | 1 | 2 | 3 | 4 | 1 | 2 |
| Emission intensity | S | S | S | S | S | W |
| Afterglow intensity | S | S | S | S | S | W |
| Emission intensity with time | S | S | S | S | W | W |

As is evident from Table 1, the photostorage solid drawing medium produced in Example 2 gave drawn lines strongly emitting light for a long time in the dark. The solid drawing mediums produced in Examples 1, 2 and 4 gave drawn lines strongly emitting light with the color of each coloring agent in a bright place and gave drawn lines strongly emitting light by the photostorage pigment itself for a long time in the dark. The photostorage drawing mediums of any of the Examples gave the drawn lines of the same emission intensity as initial for a long time after production, and showed stable performance.

On the other hand, the solid drawing medium produced in Comparative Example 1 gave drawn lines having strong emission just after production, but gave drawn lines having weaker emission with time after production. The solid drawing medium produced in Comparative Example 2 gave drawn lines having weak emission just after production.

Now, examples of the oil-based photostorage solid drawing medium are described.

Example 5

20 parts by weight of polyvinyl butyral resin (Denka Butyral 2000L manufactured by Denki Kagaku Kogyo K.K.) were added to and dissolved in a mixture of 15 parts by weight of ethylene glycol monobutyl ether, 20 parts by weight of propylene glycol monobutyl ether and 10 parts by weight of dipropylene glycol monomethyl ether. 4 parts by weight of titanium oxide and 0.5 part by weight of Neothepon Blue 807 (SOL. BLUE 70 manufactured by BASF) were added to the resulting solution, and the mixture was sufficiently dispersed with a mill. 0.5 part by weight of dibutyl phthalate was added thereto, and 4 parts by weight of xylene resin (Nicanol HP-120 manufactured by Mitsubishi Gas Chemical Company, Inc.) and 7 parts by weight of ketone resin (Highlack 111 manufactured by Hitachi Chemical Co., Ltd.) were added thereto under heating at 130° C. and dissolved under stirring at a temperature kept at 130° C. to give a uniform solution.

Then, 20 parts by weight of a photostorage pigment (TDG-3030T available from TDO Graphics Co., Ltd.) and 5 parts by weight of a sorbitol-based gelling agent (Gelol D manufactured by New Japan Chemical Co., Ltd.) were added thereto and completely dissolved. The resulting solution was poured into a container and solidified by cooling, and the solidified product was removed from the container to give an oil-based crayon-like photostorage solid drawing medium.

Example 6

15 parts by weight of cellulose acetate butyrate (CAB381-1/2" manufactured by Eastman Chemical Company) were added to and dissolved in a mixture of 20 parts by weight of propylene glycol monobutyl ether and 20 parts by weight of dipropylene glycol monomethyl ether. 5 parts by weight of xylene resin (Nikanol HP-100 manufactured by Mitsubishi Gas Chemical Company, Inc.) were added thereto under heating at 130° C. and dissolved stirring at a temperature kept at 130° C. to give a uniform solution.

Then, 30 parts by weight of a photostorage pigment (TDG-3030T available from TDO Graphics Co., Ltd.), 8 parts by weight of 12-hydroxystearic acid and 5 parts by weight of a sorbitol-based gelling agent (Gelol D manufactured by New Japan Chemical Co., Ltd.) were added thereto and completely dissolved. The resulting solution was poured into a container and solidified by cooling, and the solidified product was removed from the container to give a crayon-like photostorage solid drawing medium.

Example 7

28 parts by weight of polybutyral resin (Eslec BM-S manufactured by Sekisui Chemical Co., Ltd.) were added to and dissolved in 49.5 parts by weight of propylene glycol monobutyl ether. 8 parts by weight of xylene resin (Nicanol HP-120 manufactured by Mitsubishi Gas Chemical Company, Inc.) and 10 parts by weight of ketone resin (Highlack 111 manufactured by Hitachi Chemical Co., Ltd.) were added to the resulting solution under heating at 130° C. and dissolved under stirring at a temperature kept at 130° C. to give a uniform solution.

Then, 15 parts by weight of a photostorage pigment (TDB-3030T, containing an alkaline earth aluminosilicate as a matrix activated with a rare earth element as a long afterglow fluorescent substance and emitting bluish green fluorescence, available from TDO Graphics Co., Ltd.), 3 parts by weight of a sorbitol-based gelling agent (Gelol D manufactured by New Japan Chemical Co., Ltd.) and 1.5 parts by weight of a sorbitol-based gelling agent (Gelol T manufactured by New Japan Chemical Co., Ltd.) were added thereto and completely dissolved to give a uniform solution. The resulting solution was poured into a container and solidified by cooling, and the solidified product was removed from the container to give a crayon-like photostorage solid drawing medium.

Example 8

15 parts by weight of polybutyral resin (Eslec BL-1 manufactured by Sekisui Chemical Co., Ltd.) were added to and dissolved in a mixture of 30 parts by weight of propylene glycol monobutyl ether, 5 parts by weight of propylene glycol monomethyl ether and 10 parts by weight of 3-methyl-3-methoxybutanol. 2 parts by weight of phthalocyanine blue were added to the resulting solution and sufficiently dispersed with a mill, and 6 parts by weight of xylene resin (Nicanol HP-100 manufactured by Mitsubishi Gas Chemical Company, Inc.), 8 parts by weight of ketone resin (Highlack 111 manufactured by Hitachi Chemical Co., Ltd.) and 7 parts by weight of polyamide resin (Versamide 335 manufactured by Henkel Hakusui Corporation) were added thereto under heating at 130° C. and dissolved under stirring at a temperature kept at 130° C. to give a uniform solution.

Then, 12 parts by weight of a photostorage pigment (TDB-3030T available from TDO Graphics Co., Ltd.) and 5 parts by weight of a sorbitol-based gelling agent (Gelol D manufactured by New Japan Chemical Co., Ltd.) were added thereto and completely dissolved to give a uniform solution. The resulting solution was poured into a container and solidified by cooling, and the solidified product was removed from the container to give a crayon-like photostorage solid drawing medium.

Comparative Example 3

A crayon-like photostorage solid drawing medium was obtained in the same manner as in Example 5 except that G-300M manufactured by Nemoto & Co., Ltd. (photostorage pigment containing a long afterglow fluorescent substance represented by the chemical formula $Sr.Al_{14}O_{25}: Eu, Dy$ and having yellowish green emission) was used in place of the photostorage pigment TDG-3030T.

Comparative Example 4

A crayon-like photostorage solid drawing medium was obtained in the same manner as in Example 5 except that the photostorage pigment TDG-3030T was used in an amount of 5 parts by weight.

Comparative Example 5

A crayon-like photostorage solid drawing medium was obtained in the same manner as in Example 5 except that the photostorage pigment TDG-3030T was used in an amount of 60 parts by weight.

The crayon-like photostorage solid drawing mediums produced in Examples 5 to 8 and Comparative Examples 3 to 5 were used in drawing on commercial drawing paper, and the emission intensity and afterglow intensity of the resulting drawn lines were examined in the same manner as described hereinbefore, and the emission intensity of the drawn lines after the crayon-like photostorage solid drawing medium was left, that is, the emission intensity with time, was examined in the same manner as described hereinbefore. In evaluation of the emission intensity, afterglow intensity and emission intensity with time, a specimen having very strong emission in the dark was expressed as S, a specimen having strong emission was expressed as M, and a specimen having weak emission was expressed as W. Further, the drawing properties of the crayon-like photostorage solid drawing medium were also evaluated, and a specimen capable of smoothly drawing lines was expressed as G, and a specimen not capable of smoothly drawing lines was expressed as B. The results are shown in Table 2.

TABLE 2

|  | Examples | | | | Comparative | | |
| --- | --- | --- | --- | --- | --- | --- | --- |
|  | 5 | 6 | 7 | 8 | 3 | 4 | 5 |
| Emission intensity | S | S | S | S | S | W | S |
| Afterglow intensity | S | S | S | S | S | W | S |
| Emission intensity with time | S | S | S | S | W | W | S |
| Drawing properties | G | G | G | G | G | G | B |

As is evident from Table 2, the photostorage solid drawing mediums produced in Examples 5 and 7 gave drawn lines strongly emitting light for a long time in the dark. The photostorage solid drawing mediums produced in Examples 5 and 8 gave drawn lines strongly emitting light with the color of each coloring agent in a bright place and gave drawn lines strongly emitting light by the photostorage pigment itself for a long time in the dark. The photostorage drawing mediums produced in any of the Examples had stable performance of the same emission intensity for a long time after production.

On the other hand, the photostorage solid drawing medium produced in Comparative Example 3 gave drawn lines having strong emission just after production, but gave drawn lines having weaker emission with time after production. The photostorage solid drawing medium produced in Comparative Example 4 gave drawn lines having weak emission just after production. The photostorage solid drawing medium produced in Comparative Example 5 gave drawn lines having strong emission just after production, but was poor in smoothness upon drawing lines and inferior in drawing properties.

Now, examples of the oil-based photostorage solid drawing medium containing acrylic resin as a main resin component are described. In the following examples, as described hereinbefore, the starting materials other than the photostorage pigment and the gelling agent were mixed under heating, and then the photostorage pigment and the gelling agent were added to the resulting mixture and mixed under heating, and the thus obtained mixture in a solution form was poured into a container, solidified by cooling and removed from the container, to give the oil-based crayon-like photostorage solid drawing mediums.

Example 9

| | |
| --- | --- |
| Photostorage pigment[1] | 30.0 parts by weight |
| Gelling agent[1] | 7.0 parts by weight |
| Acrylic resin[1] | 15.0 parts by weight |
| Polyamide resin[3] | 5.0 parts by weight |
| Butylbenzyl phthalate | 4.0 parts by weight |
| Ethylene glycol monobutyl ether | 12.0 parts by weight |
| Propylene glycol monobutyl ether | 18.0 parts by weight |
| Dipropylene glycol monomethyl ether | 9.0 parts by weight |

Example 10

| | |
| --- | --- |
| Photostorage pigment[1] | 50.0 parts by weight |
| Gelling agent[1] | 3.0 parts by weight |
| Acrylic resin[1] | 10.0 parts by weight |
| Polyamide resin[3] | 4.5 parts by weight |
| Butylbenzyl phthalate | 4.0 parts by weight |
| Ethylene glycol monobutyl ether | 28.5 parts by weight |

Example 11

| | |
| --- | --- |
| Photostorage pigment[1] | 50.0 parts by weight |
| Gelling agent[1] | 4.0 parts by weight |
| Acrylic resin[1] | 9.0 parts by weight |
| Polyamide resin[3] | 4.0 parts by weight |
| Polyvinyl butyral resin[3] | 2.0 parts by weight |
| Butylbenzyl phthalate | 3.0 parts by weight |
| Ethylene glycol monobutyl ether | 12.0 parts by weight |
| Propylene glycol monobutyl ether | 16.0 parts by weight |

(Notes)

Photostorage Pigment:

1) "TDG-700D" containing an alkaline earth aluminosilicate as a matrix activated with a rare earth element as a long afterglow fluorescent substance and emitting yellow green fluorescence, available from TDO Graphics Co., Ltd.

2) "TDG-700E" containing an alkaline earth aluminosilicate as a matrix activated with a rare earth element as a long afterglow fluorescent substance and emitting yellow green fluorescence, available from TDO Graphics Co., Ltd.

Gelling Agent:

Sorbitol-based gelling agent Gelol D manufactured by New Japan Chemical Co., Ltd.

Acrylic Resin:

1) Dianal BR-103 manufactured by Mitsubishi Rayon Co., Ltd.

2) Dianal BR-107 manufactured by Mitsubishi Rayon Co., Ltd.

Polyamide Resin:

Versamide 335 manufactured by Henkel Hakusui Corporation

Polyvinyl Butyral Resin:

"Denka Butyral 2000L" manufactured by Denki Kagaku Kogyo K.K.

The crayon-like photostorage solid drawing mediums produced in Examples 9 to 11 were used in drawing on commercial drawing paper, and emission intensity, afterglow intensity and emission intensity with time of the resulting drawn lines were examined in the same manner as described hereinbefore. In evaluation of emission intensity, afterglow intensity and emission intensity with time, specimens having very strong emission, strong emission and weak emission in the dark were expressed as S, M and W, respectively. As shown in Table 3, a photostorage solid drawing medium giving drawn lines of higher emission intensity could be given when acrylic resin accounted for 50 wt % or more of the resin used.

TABLE 3

|  | Examples | | |
| --- | --- | --- | --- |
|  | 7 | 8 | 9 |
| Emission intensity | S | S | S |
| Afterglow intensity | S | S | S |
| Emission intensity with time | S | S | S |
| Drawing properties | G | G | G |

Now, an example of the photostorage solid drawing utensil according to the invention is described.

Example 12

20.0 parts by weight of polyvinyl butyral resin (Denka Butyral 2000L manufactured by Denki Kagaku Kogyo K.K.) were added to and dissolved in a mixture of 15.0 parts by weight of ethylene glycol monobutyl ether, 20.0 parts by weight of propylene glycol monobutyl ether and 10.0 parts by weight of dipropylene glycol monoethyl ether. 4.0 parts by weight of titanium oxide and 0.5 part of a coloring agent Neothepon Blue 807 (SOL. BLUE 70 manufactured by BASF) were added to the resulting solution, and the mixture was sufficiently dispersed with a mill. 0.5 part by weight of dibutyl phthalate was added thereto, and 4.0 parts by weight of xylene resin (Nicanol HP-120 manufactured by Mitsubishi Gas Chemical Company, Inc.) and 7.0 parts by weight of ketone resin (Highlack 111 manufactured by Hitachi Chemical Co., Ltd.) were added thereto under heating at 130° C. and dissolved under stirring at a temperature kept at 130° C. to give a uniform solution.

Then, 20.0 parts by weight of a photostorage pigment (TDB-3030T available from TDO Graphics Co., Ltd), 3 parts by weight of a sorbitol-based gelling agent (Gelol D manufactured by New Japan Chemical Co., Ltd.) and 5.0 parts by weight of a sorbitol-based gelling agent (Gelol T manufactured by New Japan Chemical Co., Ltd.) were added thereto and completely dissolved to give a uniform solution.

As shown in FIG. 2, an inner cap and an outer cap were attached to the tip of a holder thus closing the tip of the holder. The above solution was poured into the holder and solidified by cooling, thus charging the container in the holder with the photostorage solid drawing medium with the tip of the medium exposed in the inner cap. Thereafter, an end cap was inserted from the rear end of the holder so as to abut the rear end of the photostorage solid drawing medium, whereby a photostorage solid drawing utensil was obtained.

The inner cap, the outer cap, the holder and the end cap of the photostorage solid drawing utensil were produced by extrusion-molding polypropylene resin, among which the inner cap and the outer cap were transparent, while the holder and the end cap were rendered opaque by coloration. This photostorage solid drawing utensil having both the inner cap and the outer cap fitted therein was irradiated with a 28-W fluorescent lamp for 10 minutes, and then the inner cap and the outer cap were detached, and when the photostorage solid drawing medium exposed from the tip of the holder was used in drawing on commercial drawing paper, drawn lines were confirmed to emit light just after drawing. According to this photostorage solid drawing utensil, the photostorage solid drawing medium exposed from the tip of the main body of the container emitted light, thus facilitating drawing of lines even in the dark.

For comparison, a photostorage solid drawing utensil was prepared in the same manner as above except that both the inner cap and the outer cap were rendered opaque. This photostorage solid drawing utensil having both the inner cap and the outer cap fitted therein was irradiated with a 28-W fluorescent lamp for 10 minutes, and then the inner cap and the outer cap were detached, and when the photostorage solid drawing medium exposed from the tip of the holder was used in drawing on commercial drawing paper, drawn lines were not confirmed to emit light just after drawing. Even if the photostorage solid drawing medium was exposed from the main body of the container, this photostorage solid drawing utensil did not emit light in the dark, thus making drawing difficult.

The invention claimed is:

1. A photostorage solid drawing medium having a gel hardness of 2-50 kg/cm$^2$ which comprises 20-80% by weight of a solvent consisting essentially of water and a water-soluble organic solvent, 1-40% by weight of a resin soluble in the solvent, 2-40% by weight of at least one gelling agent selected from the group consisting of an aliphatic carboxylic acid, its salt, N-fatty acid acylamino acid and its salt, and 5.0-50.0% by weight of a photostorage pigment, each based on the weight of the photostorage solid drawing medium, wherein the photostorage pigment comprises a long afterglow fluorescent substance comprising an alkaline earth aluminosilicate as a matrix activated with a rare earth element wherein the alkaline earth element is at least one selected from the group consisting of strontium, calcium, magnesium and barium.

2. The photostorage solid drawing medium according to claim 1 wherein the gelling agent is an aliphatic carboxylic acid having carbon atoms in the range of 8 to 36, or an alkali metal salt or an ammonium salt thereof.

3. The photostorage solid drawing medium according to claim 1 wherein the gelling agent is an N-acylamino acid or its an alkali metal salt.

4. The photostorage solid drawing medium according to claim 1, which further comprises a coloring agent in an amount of 0.05-15.0% by weight based on the weight of photostorage solid drawing medium.

5. A photostorage solid drawing medium having a gel hardness of 2-50 kg/cm$^2$ which comprises 20-80% by weight of a solvent comprising at least one alcoholic solvent selected from the group consisting of glycols, glycol ethers, glycol ether esters and monovalent alcohols, 1-40% by weight of a resin soluble in the solvent, 2-40% by weight of at least one gelling agent selected from the group consisting of dibenzylidene sorbitols and tribenzylidene sorbitols, and 5.0-50.0% by weight of a photostorage pigment, each based on the weight of the photostorage solid drawing medium, wherein the photostorage pigment comprises a long afterglow fluorescent substance comprising an alkaline earth aluminosilicate as a matrix activated with a rare earth element wherein the alkaline earth element is at least one selected from the group consisting of strontium, calcium, magnesium and barium.

6. The photostorage solid drawing medium according to claim 5, wherein the resin comprises an adhesive resin selected from the group consisting of ketone resin, xylene resin, polyamide resin and acrylic resin and a film forming resin selected from the group consisting of cellulose resin and vinyl resin, and wherein the film-forming resin/adhesive resin ratio by weight is from about 1/0.1 to 1/15.

7. The photostorage solid drawing medium according to claim 5, wherein the film forming resin is at least one of cellulose acetate butyrate and polyvinyl butyral.

8. The photostorage solid drawing medium according to claim 5, wherein the amount of acrylic resin is 50% by weight or more relative to the total amount of the resins.

9. The photostorage solid drawing medium according to claim 5, which further comprises a coloring agent in an amount of 0.05-15.0% by weight based on the weight of photostorage solid drawing medium.

10. The photostorage solid drawing medium according to claim 5 in which the solvent consists essentially of at least one alcoholic solvent selected from the group consisting of glycols, glycol ethers, glycol ether esters and monovalent alcohols.

* * * * *